Nov. 15, 1955     J. BOLSEY     2,723,592
APPARATUS FOR ENLARGING PHOTOGRAPHS AND THE LIKE
Filed Nov. 14, 1952     4 Sheets-Sheet 1

FIG.1.

INVENTOR
Jacques Bolsey
BY

FIG. 2.

Nov. 15, 1955 — J. BOLSEY — 2,723,592
APPARATUS FOR ENLARGING PHOTOGRAPHS AND THE LIKE
Filed Nov. 14, 1952 — 4 Sheets-Sheet 3

INVENTOR.
Jacques Bolsey
BY

Nov. 15, 1955   J. BOLSEY   2,723,592
APPARATUS FOR ENLARGING PHOTOGRAPHS AND THE LIKE
Filed Nov. 14, 1952   4 Sheets-Sheet 4

INVENTOR.
Jacques Bolsey
BY
Michael Striker
agt

United States Patent Office 2,723,592
Patented Nov. 15, 1955

2,723,592

APPARATUS FOR ENLARGING PHOTOGRAPHS AND THE LIKE

Jacques Bolsey, New York, N. Y.

Application November 14, 1952, Serial No. 320,406

19 Claims. (Cl. 88—24)

The present invention relates to enlargers for enlarging photographs and the like.

One of the objects of the present invention is to provide an enlarger which is capable of automatically focusing the lens of the enlarger with respect to a frame supporting a light sensitive sheet on which the enlargement is to be impressed.

Another object of the present invention is to provide an enlarger, for making enlargements of different sizes, with a means for automatically focusing the lens of the enlarger in accordance with the size of the enlargement to be made.

A further object of the present invention is to provide an enlarger with a means for automatically adjusting the diaphragm aperture of the enlarger.

An additional object of the present invention is to provide an enlarger, for making enlargements of different sizes, with a means for automatically adjusting the diaphragm aperture in accordance with the size of the enlargement to be made.

A still further object of the present invention is to provide an enlarger with a means for automatically sending light through the lens of the enlarger for a predetermined length of time.

Yet another object of the present invention is to provide an enlarger, for making enlargements of different sizes, with a means for automatically sending light through the lens of the enlarger for a predetermined length of time in accordance with the size of the enlargement being made.

Still another object of the present invention is to provide an enlarger which is portable and which is capable of having parts of the enlarger stored therein to be carried therewith.

It is also an object of the present invention to provide an enlarger which is made of relatively few, ruggedly constructed and inexpensive parts.

With the above objects in view, the present invention mainly consists of an enlarger, for enlarging photographs, and the like, and including a support on which a lens means is mounted for movement along its optical axis. An operating means is connected to the lens means for moving the same along the optical axis thereof, and a frame, adapted to carry a light sensitive sheet, is removably carried on the support at a predetermined position with respect to the lens means, and, in this predetermined position, engages the operating means to hold the same at a position where the lens means is properly focused with respect to the frame so as to automatically focus the lens means by placing the frame in the said predetermined position on the support.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
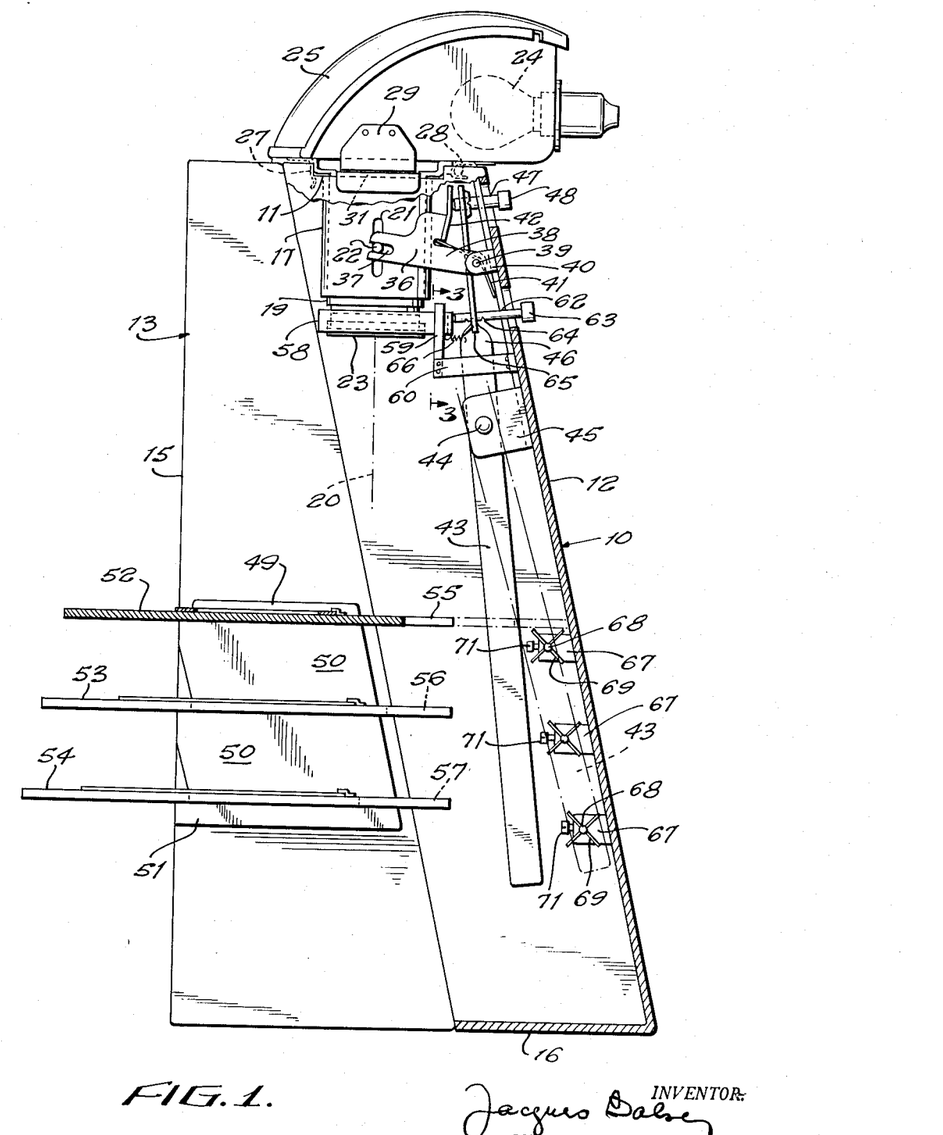
Fig. 1 is a side, sectional view through an enlarger constructed in accordance with the present invention and shown in the operative position thereof.

Referring now to the drawings, there is shown in Fig. 1 a support 10 in the form of a container having a top wall 11 formed with a suitable opening for light to pass therethrough, having a rear wall 12 extending downwardly from the top wall 11 and making with the latter an angle of between 90° and 180°, and having a pair of opposite side walls 13 each of which includes a first side wall portion 14, fixed to the top wall 11 and rear wall 12 to remain stationary with respect to the same, and a second wall portion 15, hinged to the wall portion 14 to be movable between an open position (shown in Figs. 1 and 2), where the wall portions 15 form extensions of the wall portions 14, and a closed position, where the wall portions 15 form an extension of each other and are located in a plane parallel to the rear wall 12 to close the container, each of these wall portions 15 being equal in size and shape to the half of rear wall 12 located opposite the same when the wall portions 15 are in their closed position. The support 10 finally includes a bottom wall 16 fixed to the side wall portions 14 and the rear wall 12. It is believed to be apparent that when the wall portions 15 are in their closed position, the support 10 forms a closed container adapted to carry parts of the apparatus therein, and, when the wall portions 15 are in their open position, the support 10 is in the form of a four-sided, truncated pyramid having opposite the rear wall 12 an open front which gives access to the interior of the support.

Through an opening in the top wall 11 there extends a tubular guide 17 which rests on the wall 11 by any suitable means such as flange 18 which may be bolted to the top wall 11 on the top side thereof. This tubular casing 17 is located substantially centrally of the top wall 11 and slidably supports therein a lens barrel 19 which carries lenses for projecting a beam of light along the optical axis 20. The tubular casing 17 is formed on opposite sides thereof with elongated slots 21 through which pins 22, fixed to the lens barrel 19, project. The lens barrel further includes, at its lower end, a ring 23 turnable about the optical axis 20 and connected to a diaphragm in the lens barrel for adjusting the aperture through which light travels along the optical axis 20, the tubular guide 17 having its central longitudinal axis coincident with optical axis 20 and the lens barrel 19 thereby being movable in guide 17 for focusing purposes.

Figure 4:
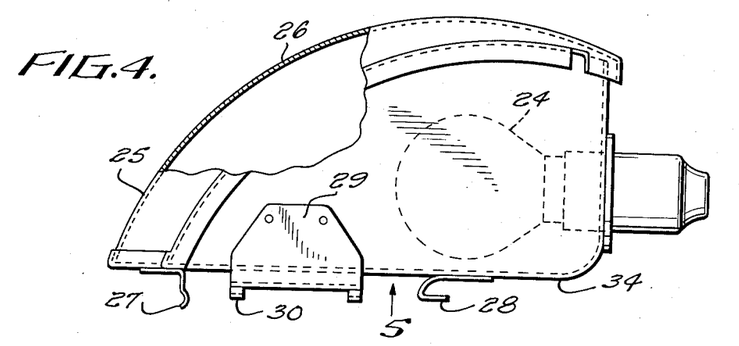
Fig. 4 is a side view of a removable light source of the enlarger of Fig. 1.
Figure 5:
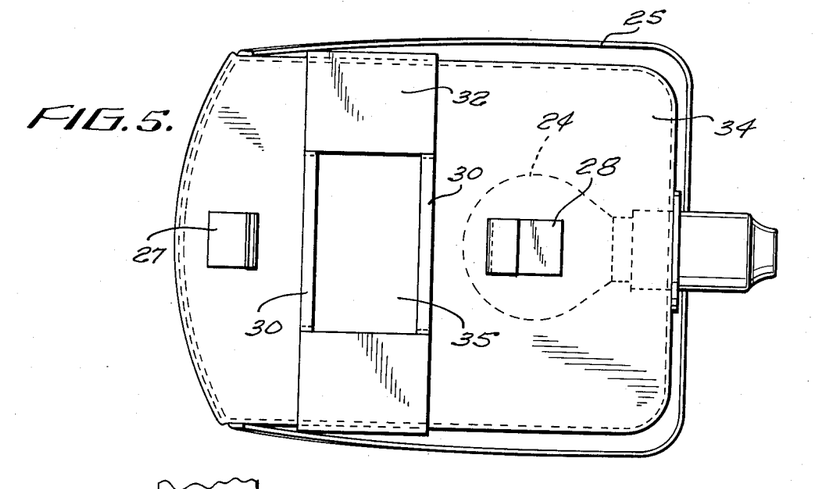
Fig. 5 is a bottom view of the structure of Fig. 4 as seen in the direction of arrow 5 of Fig. 4.

A light source, which includes a bulb 24 located in a suitable casing 25 having a reflecting surface 26 (Fig. 4) for directing light from bulb 24 along the optical axis 20, is removably connected to the top wall 11 so as to cover the same, this casing 25 having spring members 27 and 28 extending through openings in top wall 11 and engaging the latter to resiliently hold the casing 25 releasably on the top wall. The casing 25 has connected to each of its opposite sides an end 29 of a pressure plate 32 having depending runners 30 which engage a film on top wall 11 guided for movement along the same. The casing 25 and the parts associated therewith which form a light source for the reflector are shown in side view in Fig. 4, and in Fig. 5 is shown the bottom wall 34 of the casing 25 having an opening aligned with the opening 35 formed between runners 30 and through which light from reflecting surface 26 travels to the lens barrel 19 along the optical axis 20.

Figure 2:
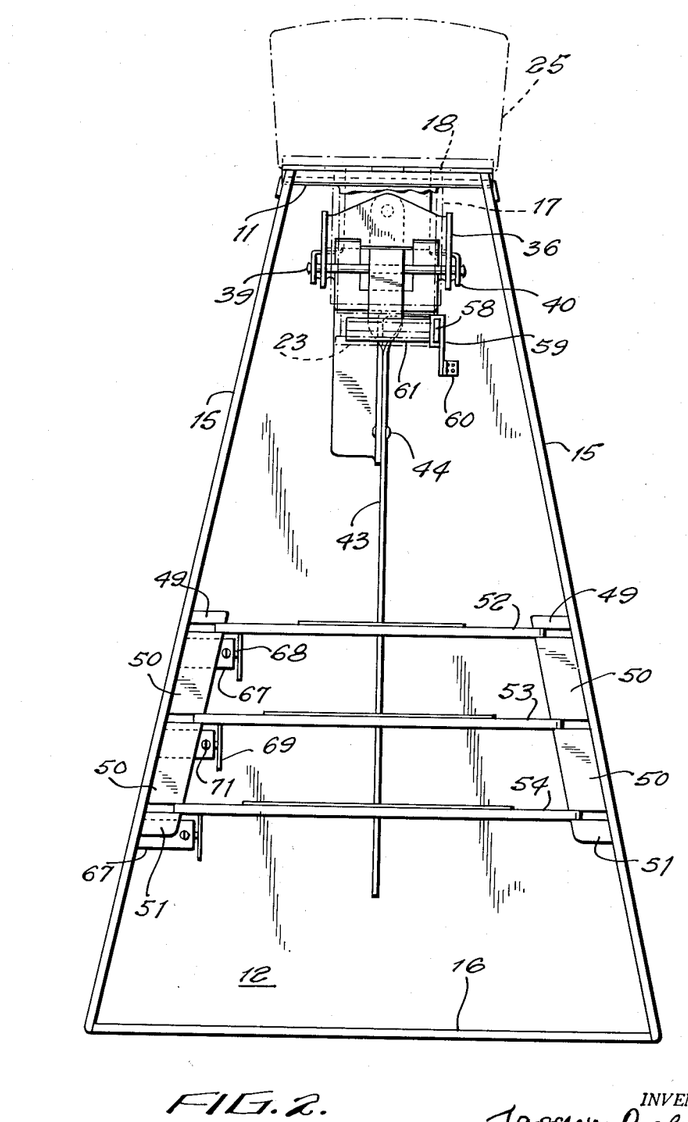
Fig. 2 is a front, elevation view of the enlarger of Fig. 1.

As is shown in Figs. 1 and 2, a substantially U-shaped member 36 has its opposite free ends formed with notches 37 in which the pins 22 are respectively located, and the member 36 has at its opposite sides rearwardly extending projections 38 which are pivotally supported at 39 on brackets 40 fixed to the inner side of rear wall 12. A wire spring 41 extends over the pivot 39 and engages the rear wall 12 and the rear side 42 of member 36 to urge the latter in a clockwise direction about the axis of pivot 39 so as to tend to raise the lens barrel 19.

An elongated, metal operating member 43 in the form of a substantially flat bar is pivoted at 44 to a bracket 45, also fixed to the inner side of rear wall 12. This operating member 43 is twisted through 90° at 46 and adjacent its top end is formed with a threaded bore through which a screw 47 extends, this screw extending through an opening substantially larger than itself in the wall 12 and having a knurled end 48 so that the operator may turn the screw 47, the latter abutting against rear wall 42 of member 36 to hold the member 43 in a predetermined position with respect to the member 36.

A carrier means in the form of pairs of guides 49, 50, and 51 is fixed to the inner sides of side wall portions 15, as is clearly shown in Figs. 1 and 2. These guides are adapted to support frames 52, 53, and 54, in a position normal to the optical axis 20 and extending across the same. These frames, which are of different sizes, will therefore be located at different elevations on the support 10 when the side wall portions 15 are in their open position. As is clearly shown in Fig. 1, the frames 52, 53, and 54, which are adapted to support a light sensitive paper or the like on which the enlargement is to be impressed, have notches 55, 56, and 57 formed in their rear edge portions, respectively, and, as is clearly evident from Fig. 1, these notches are of different lengths. (See also Fig. 8.) The frames are moved to a predetermined operative position on the support by pushing them toward the rear wall 12 until the latter is engaged by the rear edges of the frames, and during this movement of the frames into their operative positions, the operating member 43 becomes located in one of the notches 55, 56, or 57 and engaged by one of the frames to be turned about pivot 44 in a counterclockwise direction, as is shown in the dotted line position of member 43 and frame 52 in Fig. 1. The turning of the member 43 will transmit a turning movement to the member 36 and through the latter will move the lens barrel 19 along the optical axis 20. The lengths of the notches 55, 56, and 57 are carefully chosen to cause a turning of member 43, upon placing of a frame in its predetermined operative position on the support 10, which automatically locates the lens barrel 19 in the proper focusing position with respect to the frames. Thus, the notch 57 of frame 54, for example, will turn the member 43 through a different distance than the notch 55 of frame 52, for example, so that the lens barrel 19 will be automatically placed in different positions depending upon whether frames 52 or 54 are placed on the support, and these positions of the lens barrel will be the proper focusing position with respect to the frames 52 and 54, respectively. In order to pre-set the lens for a particular material being printed, it is only necessary to turn the screw 47 which may be associated with any suitable indicia on the outside of rear wall 12 adjacent to the screw 47.

Figure 3:
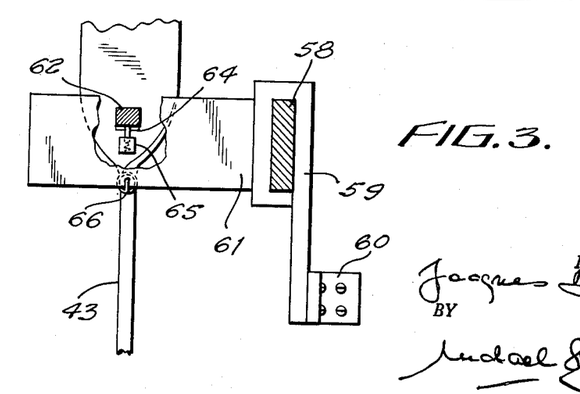
Fig. 3 is a fragmentary sectional view taken along the line 3—3 of Fig. 1 in the direction of the arrows.

A rack 58 having teeth parallel to the optical axis engages corresponding teeth on the outer periphery of diaphragm adjusting ring 23, and this rack 58 is slidably supported in a guide 59 which is fixedly carried by a bracket 60 fixed to the rear wall 12 so that the rack 58 can only move back and forth in a direction normal to the optical axis 20. The rack 58 carries at its rear end a transverse extension 61 which extends across the operating member 43, as is clearly shown in Fig. 3. The operating member 43 is formed opposite extension 61 with a square opening in which an elongated member 62 of square cross section is slidably located, this member 62 extending through a suitable opening in rear wall 12 and having a handle 63 at its outer end. The member 62 is formed with transverse grooves 64 on its under side, and a spring-pressed pin assembly 65 is fixed to the member 43 and has the pin thereof resiliently pressing against the underside of pin 62 and located in one of the grooves 64. The rack 58 is resiliently urged toward the operating member 43 by a spring 66 fixed to extension 61 and member 43 so that extension 61 always bears against the free end of member 62. The latter may be moved along the square opening in member 43 until the operator hears a click and feels a resistance to movement of the pin 62 which indicates that the spring-pressed pin of assembly 65 is in one of the grooves 64, and in this way the diaphragm may be pre-set in accordance with a particular light sensitive paper being treated. It is believed to be evident that when the member 43 is turned by one of the frames, in the manner described above, the rack 58 will be moved to automatically adjust the diaphragm, the latter being connected to ring 23 in such a way as to be properly adjusted by the single turning movement of member 43 which also focuses the lens.

As is shown in Figs. 1 and 2, a plurality of timing switches 67, of a known construction, are fixed to the interior of the support 10 next to the rear wall 12 and the left side wall portion 14, as viewed in Fig. 2. These timing switches 67 are respectively associated with the different frames and are connected in parallel with each other and with the bulb 24. Each of the timing switches 67 includes a turnable operating pin 68 having four operating arms 69 located 90° apart from each other and being fixed to the pin 68 for turning the same. When the switches are in the open position shown in Fig. 1, one of the arms 69 thereof is in the path of movement of the frames and is engaged by an edge portion thereof to be turned for closing the switch, the frame 52 of Fig. 8 clearly showing this edge portion 70 with which it engages one of the arms of the top switch 67 shown in Fig. 1. A snap over mechanism is associated with pin 68 for locating the next arm 69 in the operative position after the plate is removed from the support 10. The several switches 67 are adapted to keep the circuit through bulb 24 closed for a predetermined length of time which is different for each of these switches in accordance with the distance of the frame associated therewith from the top wall 11. Moreover, each of the switches includes a pre-setting adjusting member 71 for pre-setting the time that the switches will remain closed in accordance with the type of light sensitive paper being printed.

It is believed to be evident, therefore, that with the apparatus of Fig. 1 it is only necessary to set a frame on the support 10 with the rear edge of the frame located against the rear wall 12 in order to automatically focus the lens, adjust the diaphragm, and illuminate bulb 24 for a predetermined length of time.

Figure 6:
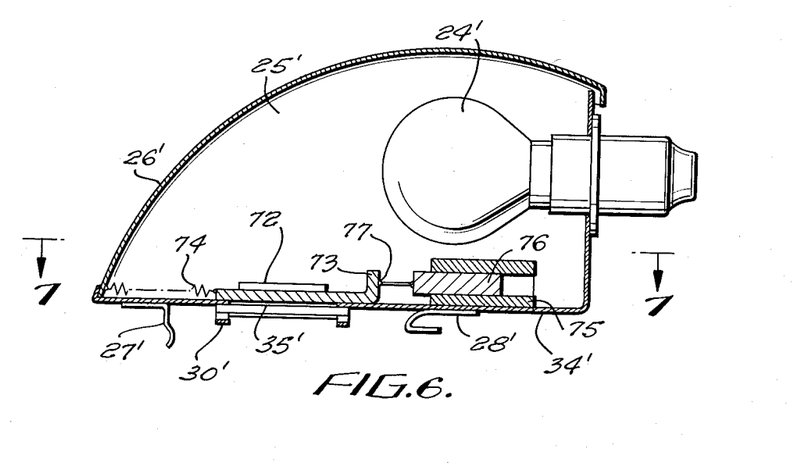
Fig. 6 is a side sectional view of a different embodiment of a light source apparatus.
Figures 7, 8:
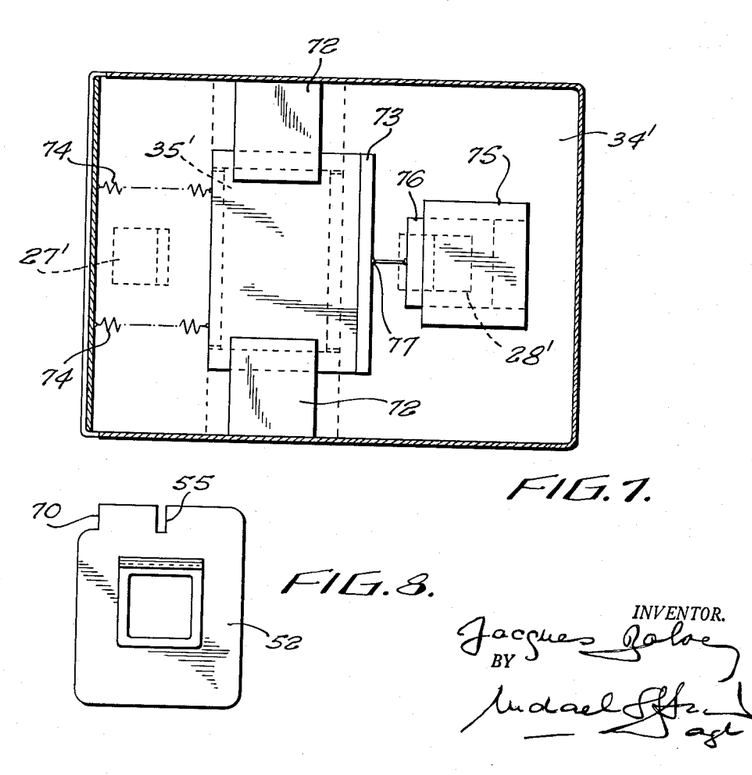
Fig. 7 is a partly sectional view of the structure of Fig. 6 taken along the line 7—7 of Fig. 6 in the direction of the arrows.
Fig. 8 is a view of a part of the structure of the present invention.

Under certain conditions it is preferable to have the bulb 24 continuously illuminated, and in order to provide such an apparatus a shutter mechanism, as shown in Figs. 6 and 7, is provided.

As may be seen from Figs. 6 and 7, a casing 25' which is substantially the same as casing 25, has mounted on its interior and on bottom wall 34' thereof a pair of guide members 72 which guide a shutter 73, in the form of a flat metal plate, for movement between a closing position, shown in solid lines in Fig. 7, where the shutter 73 is located over the opening in wall 34 aligned with opening 35' between runners 30', and an open position where the shutter is located in the dotted line position shown in Fig. 7 so as to uncover the opening in wall 34'. A pair of springs 74 are connected to the shutter 73 and the wall of casing 25' to urge the shutter 73 into its closing position, and a solenoid 75 has the armature 76 thereof connected by a link 77 to the shutter 73 so as to move the latter, against the action of spring 74, to the open position, shown in dotted lines in Fig. 7, when the solenoid 75 is energized. This solenoid 75 is connected in parallel with the several timing switches 67, and with the embodiment of Figs. 6 and 7 the bulb 24' may be continuously illuminated by a separate circuit during use of the apparatus. Thus, the solenoid 75 will be energized during the same times that the bulb 24 of the embodiment of Fig. 1 is energized so that with the embodiment of Figs. 6 and 7 light will pass along the optical axis 20 in the same way as with the embodiment of Fig. 1, the difference being that with the embodiment of Figs. 6 and 7 the bulb is continuously illuminated. Except for the above-described features of Figs. 6 and 7, the remaining structure of the enlarger is the same as was described above in connection with Figs. 1–5 and 8.

It will be understood that each of the elements described above, or two or more together, may also find a useful application in other types of apparatus for enlarging photographs and the like differing from the types described above.

While the invention has been illustrated and described as embodied in automatic apparatus for enlarging photographs and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An enlarger for enlarging photographs and the like, comprising, in combination, a support having a top wall and a rear wall extending from said top wall and making with the same an angle of between 90° and 180°; lens means mounted, for movement along its optical axis, on said support adjacent said top wall and being located opposite said rear wall; an elongated operating member extending downwardly from said top wall, being turnably mounted on said rear wall, and being operatively connected to said lens means for moving the same along said optical axis thereof; a plurality of frames of different sizes adapted to carry light sensitive sheets, said frames each having a rear edge portion adapted to be located next to said rear wall of said support and said frames respectively being formed in said rear edge portions thereof with notches of different lengths; and carrier means mounted on said support for respectively carrying said frames at different predetermined positions on said support where said frames have said rear edge portions thereof in engagement with said rear wall of said support and where said operating member is located in said notches of said frames to engage the latter and be placed thereby in different positions, respectively, with respect to said rear wall of said support, where said lens means is properly focused with respect to said frames, respectively, whereby said lens means is automatically focused by placing any of said frames on said carrier means.

2. An enlarger for enlarging photographs and the like, comprising, in combination, a support having a top wall, a pair of oppositely inclined side walls diverging from each other in a direction downwardly from said top wall, and a rear wall fixed to said side walls and top wall and making, with the latter, an angle of between 90° and 180° so that said top, side, and rear walls form a truncated pyramid having an open front opposite said rear wall to give access to the interior of said pyramid; a plurality of guide means located over each other on said side walls at different distances from said top wall and in substantially parallel relation thereto; a plurality of frame members, adapted to carry light sensitive sheets, being of different sizes and being adapted to be located on said plurality of guide means, respectively, with an edge portion of each frame member located against said rear wall, said edge portions of said frame members respectively being formed with elongated notches substantially normal thereto and being of different lengths; lens means mounted, for movement along its optical axis, on said support over said plurality of guide means, adjacent said top wall and opposite said rear wall of said support for focusing an image on frame members supported in said guide means; and an elongated operating member turnably mounted on said rear wall for movement about an axis parallel to said top wall, being located in said notches of said frame members and engaging the latter so as to be placed in different respective positions with respect to said rear wall, and being operatively connected to said lens means for moving the same along said optical axis for automatically focusing said lens means with respect to said frame members, respectively, when the latter are placed in said guide means with said edge portions of said frame members against said rear wall.

3. An enlarger for enlarging photographs and the like, comprising, in combination, a support having a top wall, a pair of oppositely inclined side walls diverging from each other in a direction downwardly from said top wall, and a rear wall fixed to said side walls and top wall and making, with the latter, an angle of between 90° and 180° so that said top, side, and rear walls form a truncated pyramid having an open front opposite said rear wall to give access to the interior of said pyramid, each of said side walls comprising a first portion fixed to and stationary with said rear wall and a second portion hinged to said first portion for turning movement between an operative position where said second portion forms a continuation of said first portion and an inoperative position where said second portion makes an angle with said first portion and is located opposite said rear wall; a plurality of guide means located over each other on said second portions of said side walls at different distances from said top wall and in substantially parallel relation thereto; a plurality of frame members, adapted to carry light sensitive sheets, being of different sizes and being adapted to be located on said plurality of guide means, respectively, with an edge portion of each frame member located against said rear wall, said edge portions of said frame members respectively being formed with elongated notches substantially normal thereto and being of different lengths; lens means mounted, for movement along its optical axis, on said support over said plurality of guide means, adjacent said top wall and opposite said rear wall of said support for focusing an image on frame members supported in said guide means; and an elongated operating member turnably mounted on said rear wall for movement about an axis parallel to said top wall, being located in said notches of said frame members and engaging the latter so as to be placed in different respective positions with respect to said rear wall, and being operatively connected to said lens means for moving the same along said optical axis for automatically focusing said lens means with respect to said frame members, respectively, when the latter are placed in said guide means with said edge portions of said frame members against said rear wall.

4. An enlarger for enlarging photographs and the like, comprising, in combination, a support; lens means mounted, for movement along its optical axis, on said support; diaphragm means associated with said lens means; operating means connected to said lens means for moving the same along said optical axis; motion transmitting means inter-connecting said operating means with said diaphragm means for adjusting the aperture of the latter upon movement of said operating means; a frame adapted to carry a light sensitive sheet; carrier means on said support for removably holding said frame normal to and extending across said optical axis of said lens means in a predetermined position with respect to said lens means and, in said predetermined position, engaging said operating means to locate the same at a position where said lens means is properly focused and said diaphragm means is properly adjusted with respect to said frame, so that said lens means is automatically focused and said diaphragm means is automatically adjusted when said frame is placed in said predetermined position thereof on said carrier means; an electrical light source located on said support over said lens means for sending light rays through the latter and along said optical axis; and a switch located in the circuit of said light source for illuminating the latter and being engaged and closed by said frame when the latter is in said predetermined position thereof so that said light source is automatically illuminated when said frame is placed in said predetermined position thereof on said carrier means.

5. An enlarger for enlarging photographs and the like, comprising, in combination, a support; lens means mounted, for movement along its optical axis, on said support; diaphragm means associated with said lens means; operating means connected to said lens means for moving the same along said optical axis; motion transmitting means inter-connecting said operating means with said diaphragm means for adjusting the aperture of the latter upon movement of said operating means; a frame adapted to carry a light sensitive sheet; carrier means on said support for removably holding said frame normal to and extending across said optical axis of said lens means in a predetermined poistion with respect to said lens means and, in said predetermined position, engaging said operating means to locate the same at a position where said lens means is properly focused and said diaphragm means is properly adjusted with respect to said frame, so that said lens means is automatically focused and said diaphragm means is automatically adjusted when said frame is placed in said predetermined position thereof on said carrier means; first adjusting means operatively connected to said lens means for pre-setting the same; second adjusting means operatively connected to said diaphragm means for pre-setting the same; an electrical light source located on said support over said lens means for sending light rays through the latter and along said optical axis; and electrical switch means adapted to automatically remain closed for a predetermined length of time, being located in the circuit of said light source for illuminating the latter and being engaged and closed by said frame when the latter is in said predetermined position thereof so that said light source is automatically illuminated for said predetermined length of time when said frame is placed in said predetermined position thereof on said carrier means.

6. An enlarger for enlarging photographs and the like, comprising, in combination, a support; lens means mounted, for movement along its optical axis, on said support; operating means connected to said lens means for moving the same along said optical axis; a frame adapted to carry a light sensitive sheet; carrier means on said support for removably holding said frame normal to and extending across said optical axis of said lens means in a predetermined position with respect to said lens means and, in said predetermined position, engaging said operating means to locate the same at a position where said lens means is properly focused with respect to said frame, whereby said lens means is automatically focused by placing said frame in said predetermined position thereof on said carrier means; an electrical light source located on said support over said lens means for sending light rays through the latter and along said optical axis; and a switch located in the circuit of said light source for illuminating the latter and being engaged and closed by said frame when the latter is in said predetermined position thereof so that said light source is automatically illuminated when said frame is placed in said predetermined position thereof on said carrier means.

7. An enlarger for enlarging photographs and the like, comprising, in combination, a support; lens means mounted, for movement along its optical axis, on said support; operating means connected to said lens means for moving the same along said optical axis; a frame adapted to carry a light sensitive sheet; carrier means on said support for removably holding said frame normal to and extending across said optical axis of said lens means in a predetermined position with respect to said lens means and, in said predetermined position, engaging said operating means to locate the same at a position where said lens means is properly focused with respect to said frame, whereby said lens means is automatically focused by placing said frame in said predetermined position thereof on said carrier means; an electrical light source located on said support over said lens means for sending light rays through the latter and along said optical axis; and electrical switch means adapted to automatically remain closed for a predetermined length of time, being located in the circuit of said light source for illuminating the latter and being engaged and closed by said frame when the latter is in said predetermined position thereof so that said light source is automatically illuminated for said predetermined length of time when said frame is placed in said predetermined position thereof on said carrier means.

8. An enlarger for enlarging photographs and the like, comprising, in combination, a support; lens means mounted, for movement along its optical axis, on said support; diaphragm means associated with said lens means; operating means connected to said lens means for moving the same along said optical axis; motion transmitting means inter-connecting said operating means with said diaphragm means for adjusting the aperture of the latter upon movement of said operating means; a frame adapted to carry a light sensitive sheet; carrier means on said support for removably holding said frame normal to and extending across said optical axis of said lens means in a predetermined position with respect to said lens means and, in said pre-determined position, engaging said operating means to locate the same at a position where said lens means is properly focused and said diaphragm means is properly adjusted with respect to said frame, so that said lens means is automatically focused and said diaphragm means is automatically adjusted when said frame is placed in said predetermined position thereof on said carrier means; an electrical light source located on said support over said lens means for sending light rays through the latter and along said optical axis; and a switch located in the circuit of said light source for illuminating the latter and being engaged and closed by said frame when the latter is in said predetermined position thereof so that said light source is automatically illuminated when said frame is placed in said predetermined position thereof on said carrier means.

9. An enlarger for enlarging photographs and the like, comprising, in combination, a support; lens means mounted, for movement along its optical axis, on said support, diaphragm means associated with said lens means; operating means connected to said lens means for moving the same along said optical axis; motion transmitting means inter-connecting said operating means with said diaphragm means for adjusting the aperture of the latter upon movement of said operating means; a frame adapted to carry a light sensitive sheet; carrier means on said support for removably holding said frame normal to and extending across said optical axis of said lens means in a predetermined position with respect to said lens means and, in said predetermined position, engaging said operating means to locate the same at a position where said lens means is properly focused and said diaphragm means is properly adjusted with respect to said frame, so that said lens means is automatically focused and said diaphragm means is automatically adjusted when said frame is placed in said predetermined position thereof on said carrier means; an electrical light source located on said support over said lens means for sending light rays through the latter and along said optical axis; and electrical switch means adapted to automatically remain closed for a predetermined length of time, being located in the circuit of said light source for illuminating the latter and being engaged and closed by said frame when the latter is in said predetermined position thereof so that said light source is automatically illuminated for said predetermined length of time when said frame is placed in said predetermined position thereof on said carrier means.

10. An enlarger for enlarging photographs and the like, comprising, in combination, a support; lens means mounted, for movement along its optical axis, on said support, diaphragm means associated with said lens means; operating means connected to said lens means for moving the same along said optical axis; motion transmitting means inter-connecting said operating means with said diaphragm means for adjusting the aperture of the latter upon movement of said operating means; a frame adapted to carry a light sensitive sheet; carrier means on said support for removably holding said frame normal to and extending across said optical axis of said lens means in a predetermined position with respect to said lens means and, in said predetermined position, engaging said operating means to locate the same at a position where said lens means is properly focused and said diaphragm means is properly adjusted with respect to said frame, so that said lens means is automatically focused and said diaphragm means is automatically adjusted when said frame is placed in said predetermined position thereof on said carrier means; an electrical light source located on said support over said lens means for sending light rays through the latter and along said optical axis; electrical switch means adapted to automatically remain closed for a predetermined length of time, being located in the circuit of said light source for illuminating the latter and being engaged and closed by said frame when the latter is in said predetermined position thereof so that said light source is automatically illuminated for said predetermined length of time when said frame is placed in said predetermined position thereof on said carrier means; first adjusting means operatively connected to said lens means for pre-setting the same; and second adjusting means operatively connected to said diaphragm means for pre-setting the same.

11. An enlarger for enlarging photographs and the like, comprising, in combination, a support; lens means mounted, for movement along its optical axis, on said support, diaphragm means associated with said lens means; operating means connected to said lens means for moving the same along said optical axis; motion transmitting means inter-connecting said operating means with said diaphragm means for adjusting the aperture of the latter upon movement of said operating means; a frame adapted to carry a light sensitive sheet; carrier means on said support for removably holding said frame normal to and extending across said optical axis of said lens means in a predetermined position with respect to said lens means and, in said predetermined position, engaging said operating means to locate the same at a position where said lens means is properly focused and said diaphragm means is properly adjusted with respect to said frame, so that said lens means is automatically focused and said diaphragm means is automatically adjusted when said frame is placed in said predetermined position thereof on said carrier means; an electrical light source located on said support over said lens means for sending light rays through the latter and along said optical axis; electrical switch means adapted to automatically remain closed for a predetermined length of time, being located in the circuit of said light source for illuminating the latter and being engaged and closed by said frame when the latter is in said predetermined position thereof so that said light source is automatically illuminated for said predetermined length of time when said frame is placed in said predetermined position thereof on said carried means; first adjusting means operatively connected to said lens means for pre-setting the same; second adjusting means operatively connected to said diaphragm means for pre-setting the same; and third adjusting means operatively connected to said switch means for pre-setting said predetermined length of time during which said switch means remains closed.

12. A portable enlarger for enlarging photographs and the like, comprising, in combination, a container having, in the open position thereof, the shape of a hollow truncated pyramid having an open side, said container having a rear wall opposite said open side thereof and opposite side walls each of which includes a first portion fixed to said rear wall and a second portion hinged to said first portion and forming an extension thereof in said open position of said container, said second portions of said side walls being turnable to a position where they form an extension of each other and are located opposite said rear wall to close said container; support means in said container for supporting a frame on which a light sensitive sheet is adapted to be placed; lens means in said container for focusing an image on said frame when said container is in said open position thereof; an electrical light source located on said container over said lens means for sending light rays therethrough; and a switch located in the circuit of said light source for illuminating the same and being engaged and closed by a frame supported by said support means so that said light source is automatically illuminated when a frame is placed on said support means in engagement with said switch when said container is in said open position thereof.

13. A portable enlarger for enlarging photographs and the like, comprising, in combination, a container having, in the open position thereof, the shape of a hollow truncated pyramid having an open side, said container having a rear wall opposite said open side thereof and opposite side walls each of which includes a first portion fixed to said rear wall and a second portion hinged to said first portion and forming an extension thereof in said open position of said container, said second portions of said side walls being turnable to a position where they form an extension of each other and are located opposite said rear wall to close said container; support means in said container for supporting a frame on which a light sensitive sheet is adapted to be placed; lens means in said container for focusing an image on said frame when said container is in said open position thereof; a light source removably connected to said container for sending light rays through said lens means along the optical axis of the latter; and electrical switch means adapted to automatically remain closed for a predetermined length of time, being located in the circuit of said light source for illuminating the latter and being engaged and closed by said frame when the latter is in a given position on said support means, so that said light source is automatically illuminated for said predetermined length of time when said frame is placed in said given position on said support means when said container is in said open position thereof.

14. An enlarger for enlarging photographs and the like, comprising, in combination, a support; lens means mounted, for movement along its optical axis, on said support; operating means connected to said lens means for moving the same along said optical axis; a frame adapted to carry a light sensitive sheet; carrier means on said support for removably holding said frame normal to and extending across said optical axis of said lens means in a predetermined position with respect to said lens means and, in said predetermined position, engaging said operating means to locate the same at a position where said lens means is properly focused with respect to said frame, whereby said lens means is automatically focused by placing said frame in said predetermined position thereof on said carrier means; a light source located on said support over said lens means for sending light rays through the latter and along said optical axis; shutter means mounted on said support between said light source and lens means for movement between a closed position, where said shutter means cuts off said light rays from said lens means, and an open position, where said shutter means is out of the path of the light rays extending from said light source through said lens means; and moving means connected to said shutter means for moving the same between said positions thereof and being engaged by said frame when the latter is in said predetermined position thereof to move said shutter means to said open position thereof so that said light rays automatically pass through said lens means when said frame is placed on said carrier means.

15. An enlarger for enlarging photographs and the like, comprising, in combination, a support; lens means mounted, for movement along its optical axis, on said support; operating means connected to said lens means for moving the same along said optical axis; a frame adapted to carry a light sensitive sheet; carrier means on said support for removably holding said frame normal to and extending across said optical axis of said lens means in a predetermined position with respect to said lens means and, in said predetermined position, engaging said operating means to locate the same at a position where said lens means is properly focused with respect to said frame, whereby said lens means is automatically focused by placing said frame in said predetermined position thereof on said carrier means; a light source located on said support over said lens means for sending light rays through the latter and along said optical axis; shutter means mounted on said support between said light source and lens means for movement between a closed position, where said shutter means cuts off said light rays from said lens means, and an open position, where said shutter means is out of the path of the light rays extending from said light source through said lens means; moving means connected to said shutter means for moving the same between said positions thereof and being engaged by said frame when the latter is in said predetermined position thereof to move said shutter means to said open position thereof so that said light rays automatically pass through said lens means when said frame is placed on said carrier means; and automatic timing means operatively connected to said moving means for actuating the latter to move said shutter means to said closed position thereof after said shutter means has remained in said open position thereof for a predetermined length of time after said frame is placed in said predetermined position thereof in said support.

16. An enlarger for enlarging photographs and the like, comprising, in combination, a support; light projecting means mounted on said support for projecting light along a pre-determined optical axis; adjusting means operatively connected to said light projecting means for adjusting the same; operating means connected to said adjusting means for operating the same; a frame adapted to carry a light sensitive sheet; carrier means on said support for removably holding said frame normal to and extending across said optical axis in a predetermined position with respect to said light projecting means and, in said predetermined position, engaging said operating means to locate the same at a position where said adjusting means properly adjusts said light projecting means with respect to said frame, whereby said light projecting means is automatically adjusted by placing said frame in said predetermined position thereof on said carrier means; an electrical light source located on said support over said light projecting means for directing light through the latter along said optical axis; and a switch located in the circuit of said light source for illuminating the latter and being engaged and closed by said frame when the latter is in said predetermined position thereof so that said light source is automatically illuminated when said frame is placed in said predetermined position thereof on said carrier means.

17. An enlarger for enlarging photographs and the like, comprising, in combination, a support; light projecting means mounted on said support for projecting light along a predetermined optical axis, said light projecting means including a diaphragm for regulating the aperture through which the light travels along said optical axis; adjusting means operatively connected to said diaphragm for adjusting the same; operating means connected to said adjusting means for operating the same; a frame adapted to carry a light sensitive sheet; carrier means on said support for removably holding said frame normal to and extending across said optical axis in a predetermined position with respect to said light projecting means and, in said predetermined position, engaging said operating means to locate the same at a position where said adjusting means properly adjusts said diaphragm with respect to said frame, whereby said diaphragm is automatically adjusted by placing said frame in said predetermined position thereof on said carrier means; an electrical light source located on said support over said light projecting means for directing light through the latter along said optical axis; and electrical switch means adapted to automatically remain closed for a predetermined length of time, being located in the circuit of said light source for illuminating the latter and being engaged and closed by said frame when the latter is in said predetermined position thereof so that said light source is automatically illuminated for said predetermined length of time when said frame is placed in said predetermined position thereof on said carrier means.

18. An enlarger for enlarging photographs and the like, comprising, in combination, a support; light projecting means mounted on said support for projecting light along a predetermined optical axis, said light projecting means including a light source; adjusting means operatively connected to said light source for adjusting the same, said adjusting means comprising a switch located in the circuit of said light source and adapted to remain closed for a predetermined length of time; operating means connected to said switch for operating the same; a frame adapted to carry a light sensitive sheet; and carrier means on said support for removably holding said frame normal to and extending across said optical axis in a predetermined position with respect to said light projecting means and, in said predetermined position, engaging said operating means to close said switch, whereby said light projecting means is automatically operated by placing said frame in said predetermined position thereof on said carrier means.

19. An enlarger for enlarging photographs and the like, comprising, in combination, a support; light projecting means mounted on said support for projecting light along a predetermined optical axis, said light projecting means including a shutter movable on said support from a closed position where said shutter extends across said optical axis to prevent light from traveling therealong to an open position where said shutter is located to one side of said optical axis to allow light to travel therealong; operating means connected to said shutter for moving the same between said positions thereof; a frame adapted to carry a light sensitive sheet; and carrier means on said support for removably holding said frame normal to and extending across said optical axis in a predetermined position with respect to said light projecting means, and in said predetermined position, engaging said operating means to cause the latter to move said shutter to said open position thereof, whereby light automatically travels along said optical axis when said frame is placed in said predetermined position thereof on said carrier means.

References Cited in the file of this patent

UNITED STATES PATENTS

| | | |
|---|---|---|
| 1,235,685 | Hansch | Aug. 7, 1917 |
| 1,527,883 | Lare | Feb. 24, 1925 |
| 1,561,910 | Cheaney | Nov. 17, 1925 |
| 1,950,166 | Durholz | Mar. 6, 1934 |
| 1,950,533 | Westendorp | Mar. 13, 1934 |
| 1,994,091 | Shwartz | Mar. 12, 1935 |
| 2,397,742 | Kals | Apr. 2, 1946 |